United States Patent [19]

Rubenstein

[11] E Re. 29,511

[45] Reissued Jan. 10, 1978

[54] PARKING METER

[76] Inventor: Burrell R. Rubenstein, 3604 Jefferson, Kansas City, Mo. 64111

[21] Appl. No.: 680,575

[22] Filed: Apr. 26, 1976

Related U.S. Patent Documents

Reissue of:

[64] Patent No.: 3,930,363
Issued: Jan. 6, 1976
Appl. No.: 490,221
Filed: July 19, 1974

[51] Int. Cl.[2] ..... G07C 1/30

[52] U.S. Cl. ..... 58/142; 58/39.5; 340/51

[58] Field of Search ..... 58/39.5, 141-143; 235/92 PE, 92 T, 92 EA; 340/51; 194/DIG. 22, DIG. 18

[56] References Cited

U.S. PATENT DOCUMENTS

| | | | |
|---|---|---|---|
| 3,166,732 | 1/1965 | Ljungman et al. | 58/142 X |
| 3,183,411 | 11/1965 | Palfi | 317/123 |
| 3,300,771 | 1/1967 | Wagner | 58/39.5 X |
| 3,535,870 | 10/1970 | Michell | 58/142 |
| 3,616,644 | 11/1971 | Adler et al. | 58/143 |

*Primary Examiner*—Robert K. Schaefer
*Assistant Examiner*—Vit W. Miska
*Attorney, Agent, or Firm*—C. A. Phillips

[57] ABSTRACT

A parking meter which electrically indicates "remaining time" and which electrically operates only in the presence of a vehicle and when there is "paid-for" time on the meter. Thus, for example, unused time by one departing motorist is cancelled.

6 Claims, 1 Drawing Figure

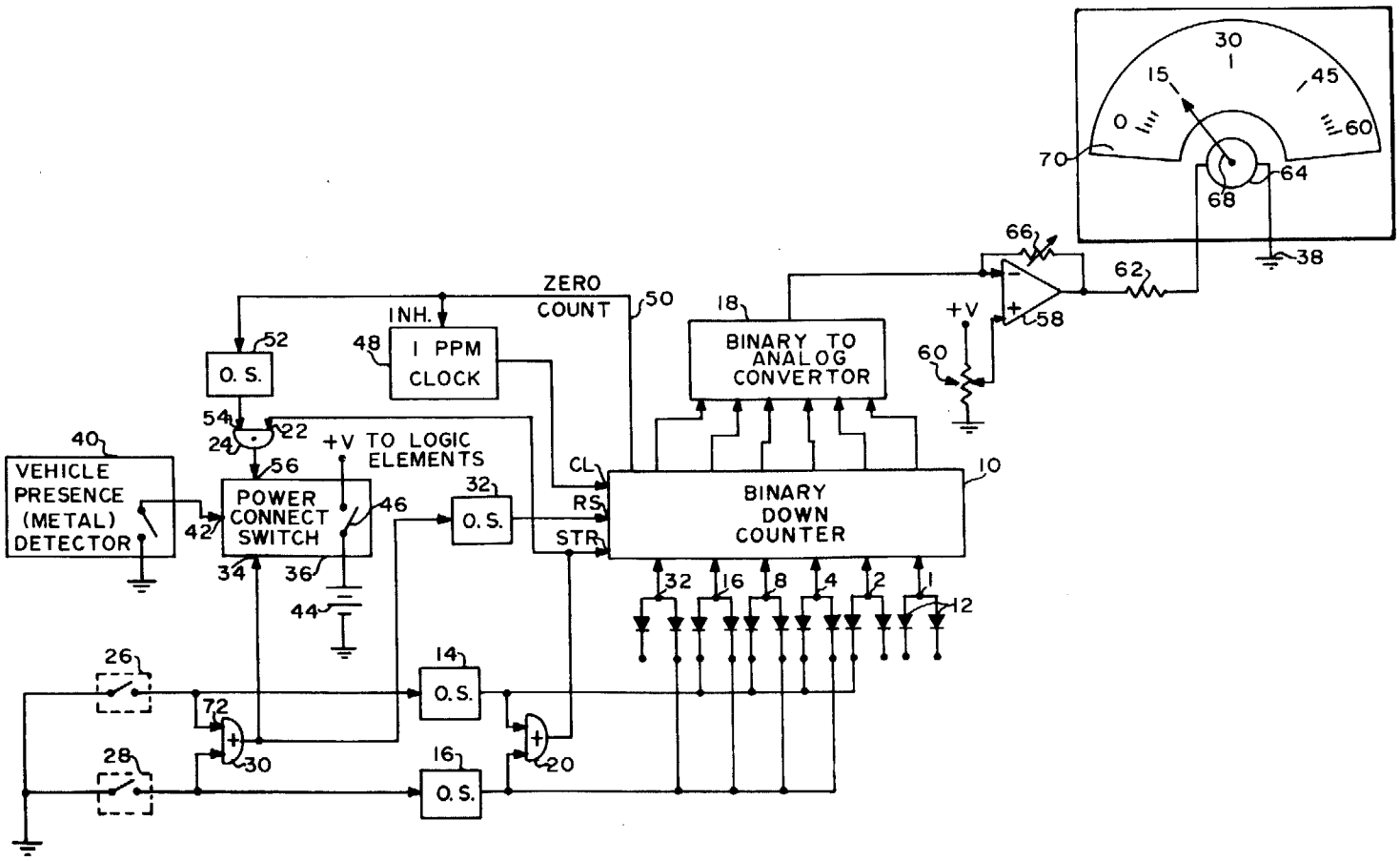
BINARY TO ANALOG CONVERTOR
BINARY DOWN COUNTER
ZERO COUNT
INH.
1 PPM CLOCK
O. S.
+V TO LOGIC ELEMENTS
POWER CONNECT SWITCH
VEHICLE PRESENCE (METAL) DETECTOR
CL
RS
STR
+V

PARKING METER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to parking meters, and particularly to an improved digitally-controlled electronic parking meter.

2. General Description of the Prior Art

Conventional parking meters are essentially coin-operated mechanical clocks. They are fairly expensive and require a good deal of service to properly maintain them. Their efficiency insofar as financial return is concerned is seriously impeded by virtue of the fact that the unused time by one motorist may be used by a second motorist without further payment. It is the object of the present invention to overcome these deficiencies.

SUMMARY OF THE INVENTION

In accordance with this invention, a parking meter is constructed utilizing an electronic down counter. [A metal locator positioned on the parking meter is directed toward the parking space to be covered, and it operates a switch which readies the meter; and if the meter is on and a vehicle departs, it turns the meter off.] Appropriate denomination coin-operated switches set the down counter to an appropriate timing count, e.g. a dime coin would set the down counter to 30, representing 30 minutes. The operation of the coin switch starts a one-pulse-per-minute clock, which counts the down counter down. The output of the down counter is connected to a readout (either of the digital or analog types) to display remaining paid-for occupancy of a parking space.

BRIEF DESCRIPTION OF THE DRAWING

The single drawing is an electrical schematic diagram of an embodiment of the invention.

DETAILED DESCRIPTION OF THE DRAWING

Referring to the drawing, there is shown an electrical block diagram of one embodiment of the invention. Basic timing [fur] *of* the parking meter is accomplished by binary down counter 10, which in this system is a six stage binary counter. The set input of each stage of binary down counter 10 is selectively coupled through an isolation diode 12 to the outputs of one shots 14 and 16. The set output of each stage of binary down counter is in turn connected as an input to binary to analog converter 18, which converts the binary output to a voltage which is representative of the binary value stored in binary down counter 10. The outputs of one shots 14 and 16 are "OR" coupled together by OR gate 20, the output of which serves as a strobe input STR to the binary counter. The output of OR gate 20 is further connected as an "inhibit" input 22 of AND gate 24. The inputs of one shots 14 and 16 are connected to the stationary contacts of coin-operated switches 26 and 28, which are also "OR" coupled together by OR gate 30. The output of OR gate 30 is coupled as a trigger input to one shot 32, the output of which is fed as a reset signal RS to reset binary counter 10. The output of OR gate 30 is also connected as a "turn on" signal 34 to power connect switch 36. The movable arms of coin-operated switches 26 and 28 are tied together and to common ground 38. One contact of vehicle presence detector switch 40 is connected to common ground, and the movable arm is connected as an enable input 42 of power connect switch 36. Power to operate the system is applied from battery 44, the negative terminal of which is tied to common ground, and the plus end of which is connected to movable arm 46 [of] *to* power connect switch 36, having a stationary contact connected as a plus voltage output to all logic elements of the system. A selected count stored in binary down counter 10 is counted down in discrete increments by the output of one PPM clock 48, the output of which is connected to the clock input CL of binary down counter 10. Once the down counter counts to zero, or if it has been reset to zero, a pulse is produced on zero count line 50, which inhibits one PPM clock 48 and applies a trigger pulse to one shot 52. The output of one shot 52 is connected as one input 54 of AND gate 24, which is connected as a "turn off" signal 56 to power connect switch 36. The output of binary down counter 10 is coupled to the input of binary to analog converter [10] *18*, which converts the "time remaining" binary count to an analog signal. This signal is coupled to the inverting output of amplifier 58, which has a positive or noninverting input connected to the wiper of potentiometer 60. Calibration potentiometer 60 is connected between plus voltage and common ground. The output of amplifier 58 is connected through series meter resistor 62 and meter movement 64 to common ground 38. The output of amplifier 58 is scaled with respect to the input by feedback resistor 66, which varies the gain of amplifier 58. Elongated pointer 68 is attached to meter 64 and serves to indicate remaining parking time in minutes between 0 and 60 minutes, as observed on calibrated scale 70.

For the purpose of illustrating operation of the system, it is assumed that a 10-cent coin allows parking for a period of 30 minutes, while a 25-cent coin permits one hour of parking. Accordingly, the output of one shot 14 is strapped to the 1, 2, 4, and 8 inputs of binary counter 10 to thus set a count of 30 into binary counter 10. The output of one shot 16 is connected as shown to the 4, 8, 16, and 32 inputs of binary counter 10, and thus a count of 60 would be gated by a quarter into binary counter 10. In operation, once a vehicle has been parked in the space served by the parking meter, presence detector switch 40 (a conventional metal locator adapted to close a switch when metal is determined and which would be pointed at the parking space involved) is closed. This switch provides an enable input to input 42 of power connect switch 36.

Assuming it is desired to park 30 minutes, a 10-cent coin would be inserted, which would close coin switch 26. This switch is a roll-over type switch, and hence the coin would simply roll over the switch, close it, and then open it. Upon the closure of the switch, a ground is applied to one input 72 of OR gate 30, which produces a pulse to input 34 of power connect switch 36, which closes contacts 46, applying plus voltage to all logic elements of the parking meter. When the coin rolls over a switch 26, an output of OR gate 30 triggers one shot 32 and an output of switch 26 triggers one shot 14. [An output of one shot 32 applies a reset pulse to binary counter 10 and resets counter 10 to a zero condition.] An output of one shot 14, which is a longer delay than one shot 32, applies a true signal through diodes 12 to inputs 1, 2, 4, and 8 of binary counter 10. An output of OR gate 20 applies a strobe pulse to counter 10 and inhibits input 22 of AND gate 24. At the end of the reset pulse, and output appears on zero count line 50, which inhibits one PPM clock 48 and applies a trigger pulse to one shot 52. The output pulse of one shot 52 occurs at input 54 of AND gate 24, which does not produce an output to the turn off input 56 of power connect switch 36, since input 22 is inhibited by an output of OR gate 20.

Accordingly, at the end of the output from one shot 14, a count of 30 is gated into binary down counter 10 by the strobe at the output of OR gate 20. Once the count is gated into the counter, zero count line 50 is no longer true, and one PPM clock 48 is enabled and produces a train of pulses, which occur at one-minute intervals. Each clock pulse at the countdown input CL subtracts one count from binary down counter 10. A voltage which represents the 30-minute count is fed to amplifier 58 and produces a current which causes the meter to be deflected to the observed 30-minute marker of scale 70. This is calibrated as follows so as to read an accurate count. With the binary counter set to zero, potentiometer 60 is adjusted so that the indicator reads zero. With a count of 60 in the binary counter, scale adjust resistor 66 has been set to read 60 minutes on the indicator. Once the timer has been energized by the insertion of a coin, 30 discrete counts from one PPM clock 48 subtract the count previously stored in binary counter 10, and the count now is at zero count. An output of zero count line 50 inhibits clock 48 and triggers one shot 52. The output of one shot 52 is now coupled through AND gate 24 to the turn off input 56 of power connect switch 36. This pulse opens power connect switch 36, disconnecting power from the parking meter.

Thus, regardless of the time the vehicle is left in the [paring] *parking* space, no further energy is drawn from the parking meter battery 44. A like series of events occur when a 25-cent coin is deposited in the parking meter. The coin rolls over switch 28, which closes and opens as before described. Before opening of the switch, power connect switch 36 is closed through input 34 and one shot 32 is triggered to reset binary counter 10. The output of one shot 16 applies a strobe signal to the counter and an inhibit to AND gate 24 through OR gate 20 and presents a true signal to the 4, 8, 16, and 32 inputs of binary counter 10. In this manner, a count of 60 is now gated into the binary counter. Zero count line 50 is no longer true, which enables clock 48, and a count of 60 is indicated by indicator 68. Thus, after 60 counts, the counter counts down to zero, and zero count line 50 again inhibits clock 48 and produces a pulse at the output of one shot 52, which disconnects power connect switch 36. Assuming that at any time during the one-hour parking period a vehicle is removed from the parking space, then vehicle presence detector switch 40 would open. Since a ground is required at enable input 42 of power switch 36 in order to maintain the switch at an "on" position, once the vehicle drives off, switch 36 opens and removes power from the meter, which then goes to zero time on the indicator and the battery is disconnected from the logic so as not to drain power from the battery. This also prevents the next vehicle from receiving free parking time, since in order to legally park, a coin must again be deposited in the meter.

What is claimed is:

1. A parking meter comprising:

counting means comprising:

an electrical down counter, first input means responsive to a selected input for initially setting said down counter to a selected count, and second input means for providing clock input signals to said down counter, whereby with each signal said down counter is counted down a selected count;

coin-operated switching means including at least one coin switch and means responsive to the receipt of a particular coin for operating said switch and providing a selected count input to said first input means of said down counter;

vehicle detection means responsive to the detection of the presence of a vehicle for applying a circuit operating bias to at least said counting means;

clock means for providing electrical pulses at a selected time rate to said second input means; and readout means responsive to the output of said down counter for visually indicating an output state of said down counter.

2. A parking meter as set forth in claim 1 wherein said readout means comprises means for indicating whether time remaining on said meter is finite or zero.

3. A parking meter as set forth in claim 2 wherein said readout means comprises means for indicating the remaining "paid for" time on said meter.

4. A parking meter as set forth in claim 1 wherein said readout means is a meter, indicating "remaining time" in minutes.

5. A parking meter as set forth in claim 4 wherein said vehicle detection means comprises metal detection means for applying said operating bias upon the detection of the presence of a metal body.

*6. A parking meter comprising:*

*counting means comprising:*

*an electrical down counter,*

*first input means responsive to a selected input for initially setting said down counter to a selected count, and*

*second input means for providing clock input signals to said down counter, whereby with each signal said down counter is counted down a selected count;*

*coin-operated switching means including at least one coin switch and means responsive to the receipt of a particular coin for operating said switch and providing a selected count input to said first input means of said down counter;*

*clock means for providing electrical pulses at a selected time rate to said second input means; and*

*readout means responsive to the output of said down counter for visually indicating remaining paid-for time.*

* * * * *